UNITED STATES PATENT OFFICE.

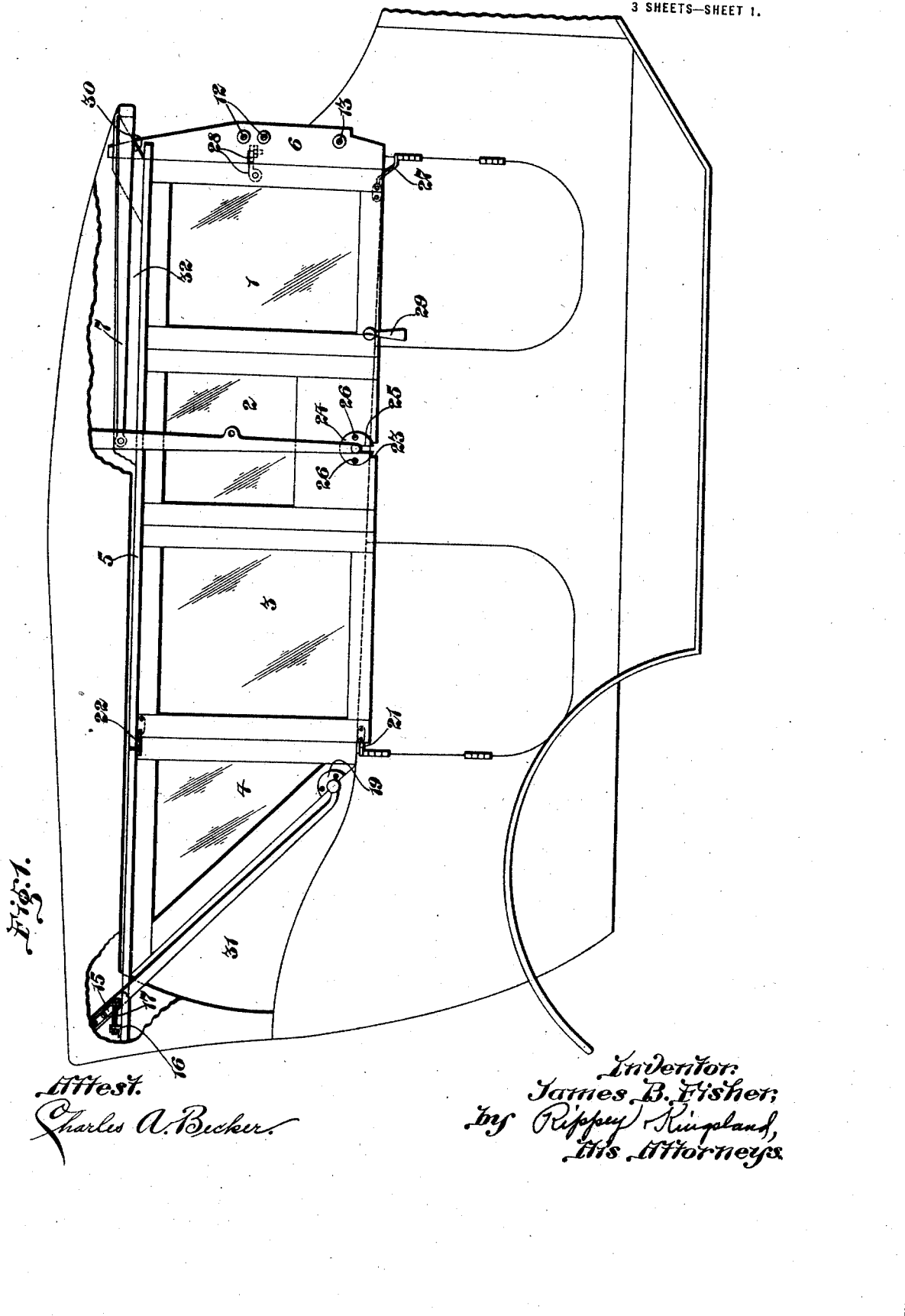

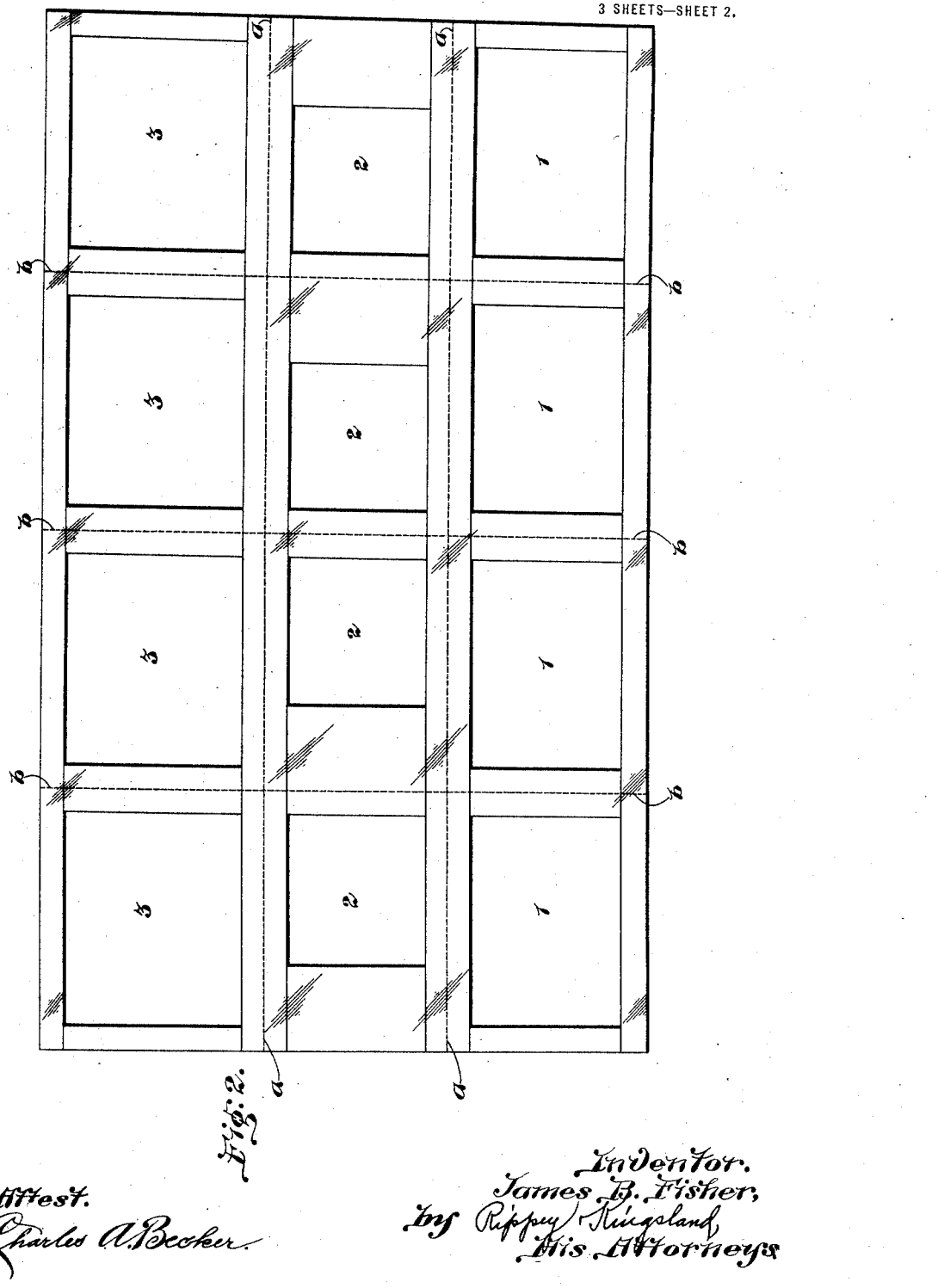

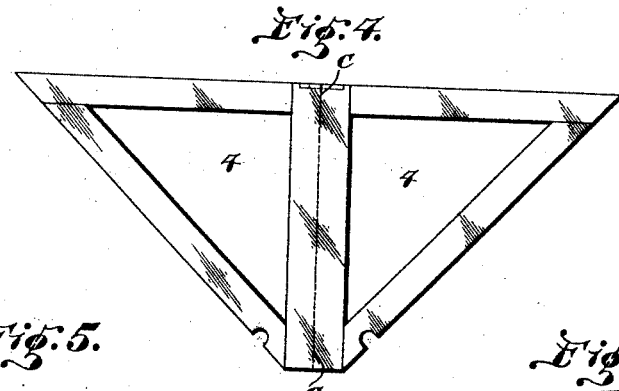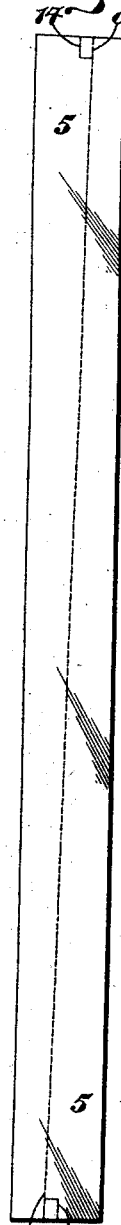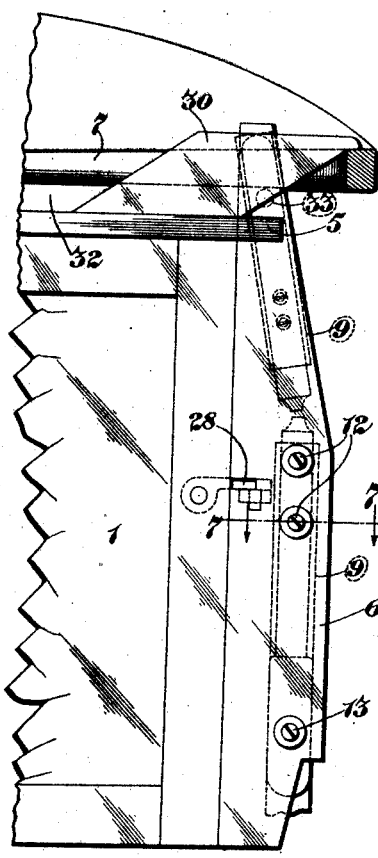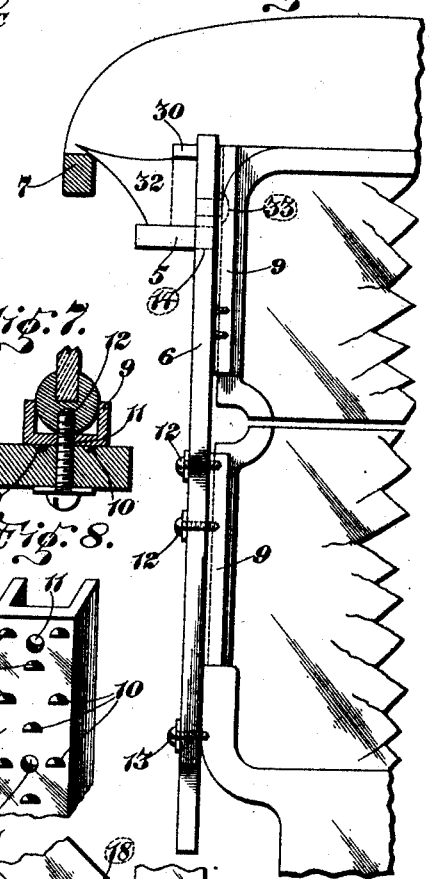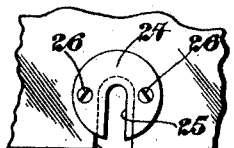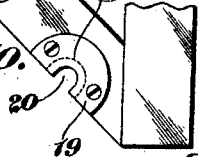

JAMES B. FISHER, OF ST. LOUIS, MISSOURI.

VEHICLE BODY INCLOSURE.

1,415,928.  Specification of Letters Patent.  Patented May 16, 1922.

Application filed Feburary 18, 1920. Serial No. 359,494.

*To all whom it may concern:*

Be it known that I, JAMES B. FISHER, a citizen of the United States, residing at the city of St. Louis and State of Missouri, have invented new and useful Improvements in Vehicle Body Inclosures, of which the following is a specification.

This invention relates to improvements in vehicle body inclosures, and consists in the novel construction hereinafter disclosed.

An object of the invention is to provide an inclosure of the character mentioned which can be manufactured at an extremely economical cost and which may be readily applied to a vehicle body, equipped with the usual cape top, by any one without the exercise of special skill, and which will constitute an effective closure for the vehicle body.

Another object of the invention is to provide an inclosure of the class mentioned comprising a plurality of sash arranged to be carried in a frame attached to a standard vehicle body equipped with a cape top, certain of the sash being mounted to open with the doors of the vehicle body.

Another object of the invention is to provide an inclosure of the class described including a plurality of sash so arranged as to fill the space between the vehicle body and the usual cape top, with means for alining the parts so that the inclosure may be assembled by an unskilled person without fitting the separate parts.

Additional advantages and features of the construction will be apparent from the following detailed description thereof taken in connection with the accompanying drawings, in which Fig. 1 is a side elevation of a vehicle body illustrating the inclosure of the present invention assembled therewith.

Fig. 2 is a construction view illustrating the assembly of sash frame and the method of sawing the frame into the separate sash.

Fig. 3 is a view illustrating the manner in which the stringer of the frame element is manufactured.

Fig. 4 is a view illustrating the frame from which the triangular sash, constituting one of the elements of the inclosure, is made.

Fig. 5 is an enlarged view illustrating the front end of the inclosure and the method by which it is connected with the vehicle wind shield.

Fig. 6 is a front elevation of the same portion of the inclosure.

Fig. 7 is a detailed section taken on the line 7–7 of Fig. 5.

Fig. 8 is a detailed view of a connecting bracket for attaching the inclosure to the wind shield.

Fig. 9 is a detailed view illustrating a socket for connecting the inclosure with the brackets upon which the bow of the top is pivoted.

Fig. 10 is a detailed view of the socket construction for attaching the adjacent panel of the inclosure with the back bracket.

As illustrated in the drawings and particularly in Fig. 2, the main section of the side inclosure is composed of three panels 1, 2 and 3 respectively. These panels are rectangular in shape and are preferably cut from a rectangular frame of sufficient dimensions to produce a plurality of sets of the panels. The frame is first made up as illustrated in Fig. 2, and then saw-cut along the lines $a$—$a$ and $b$—$b$. The vertical dimension of the frame illustrated in Fig. 2 is equal to the longitudinal dimension of the space to be filled by the panels, so that regardless of the accuracy of the severing cut between the panels, the aggregate length of the panels when assembled in connection with the body will be the length of the space to be filled thereby with just sufficient clearance space between, due to the saw-cut in the manufacturing operation. This method of forming the panel provides an economical method of manufacture and avoids the necessity of accurately fitting separately formed panels.

The rear panel 4 of the inclosure may likewise be cut from a frame, as illustrated in Fig. 4; that is to say, the frame is made up to include a pair, or a plurality of panels and then cut along the line $c$—$c$.

In the construction of the top stringer constituting the top member of the frame, duplicate stringers 5 are cut from a rectangular blank illustrated in Fig. 3 along a diagonal line $d$—$d$.

The frame in which the panels are set includes the stringers 5 and a front member 6. The frame is arranged to be set in connection with the usual cape top of a motor vehicle, the only adjustment that is necessary being the raising of the front bow 7 of the top, by removing the ends of the bow from the standard bracket and raising and securing the ends of the bow, so that the bow will extend substantially horizontally, instead of at an inclined position as is usual in the standard top construction in order to provide clearance for the front door sash to swing open.

In assembling the frame the usual wind shield brackets are removed and the member 6 is attached to the wind shield by means of the connecting bracket 9 shown in detail in Fig. 8. The bracket 9 is preferably in the form of a channel having projections 10 on its outer face and being provided with openings 11. The bracket is fitted over the side edge of the wind shield and secured in place in connection with the member 6 by screws 12. The member 6, after being alined and attached in the manner described, is held from displacement by the projections 10 on the outer face of the bracket 9. In order to insure rigidity of the member 6 the lower end thereof may be connected with the wind shield at a low point by a screw 13. The screws 12 and 13 extend through holes in the member 6, said holes being of a greater diameter than the screws so that adjustment of the member 6 may be made. A washer may be interposed between the head of the screws and the face of the holes, if desired.

The top stringer 5 is provided with a notch 14 so that when the stringer is adjusted in horizontal position with the wide end thereof in front, the notch will seat against the back and side of the member 6, the member 6 and the front end of the stringer 5 being connected together in any suitable manner.

The stringer 5 extends backwardly substantially the full length of the top and is connected with the back bow of the top by an adjustable connection comprising a bracket 15 attached to the back bow of the top near the upper part thereof. A bracket 16 is secured to the upper face of the stringer 5 near the end thereof and a bolt 17, extending through openings in the brackets 15 and 16, respectively, is arranged to adjustably secure the stringer 5 in connection with the rear bow of the top.

The rear panel 4 is of triangular shape to close the space between the rear bow and a line extending vertically slightly in advance of the pivot axis of the rear door. This panel 4 is notched at 18 and an adjustable plate 19, having a notch 20 of less cross measurement than that of the notch 18, constitutes the attaching socket for connecting the panel with the rear bracket which supports the rear bow of the top. After the panel has been set in proper alinement, the rear plate 19 is screwed to the panel frame holding the panel rigidly in place.

The panel 3 is supported on hinges 21 and 22 respectively, the lower hinge 21 including a bracket attached to the lower edge of the panel, and the hinge 21 being arranged to swing on the same hinge pin as supports the upper hinge of the door. The upper hinge 22 includes a bracket attached to the panel, which bracket is pivoted on a pivot pin supported by the stringer 5, or it may be supported by the upper part of the panel 4, the pivot axis of both hinges being arranged in vertical alinement.

The panel 2 is mounted in the space intermediate the front and rear door, being supported at its lower edge by the front bow bracket of the vehicle body. The connection between the panel and the bracket includes a notch 23 in the lower edge of the panel over which is fitted a plate 24 having a notch 25 therein of less width than the notch 23. This construction provides for a limited adjustment of the panel so as to properly aline it in the space that it is intended to fill. After the panel has been alined the plate 24 is rigidly secured in connection with the panel by screwing it thereto with screws 26.

The panel 1 is supported in place by hinges 27 and 28 respectively, the hinge 27 comprising an angular bracket which is pivoted on a common hinge pin with the upper hinge of the front door, and the hinge 28 comprising a bracket attached to the inner face of the front of the panel 1, which is pivoted to a support carried by the member 6. The hinges 27 and 28 are arranged on a common vertical axis with the hinges of the front door so that when the door is swung the panel will open outwardly in unison with the movement of the door.

I prefer in the construction to provide a single exterior door-opening handle 29 attached to the front door, which handle may be locked if desired, preventing access to the inside of the vehicle when the other doors are closed.

It will be observed that the width of the panels 1 and 3 is slightly in excess of the width of the doors, in order to provide ample space for entering through the door openings of the inclosure.

In order to impart rigidity to the frame and to assist in steadying the front of the cape top, a bracket 30 is interposed between the front end of the stringer 5 and the bow of the standard top. The space between the panel 4 and the back apron of the top is preferably closed by a triangular shaped curtain 31. The space between the stringer and the edge of the standard cape top may be closed by a filler 32 of flexible material such, for instance, as cardboard, or similar material. This filler is cut to proper dimensions to fill the space and then secured in place by tacking, or by other suitable means of attachment.

The upper section of the wind shield of the vehicle is preferably attached to the inner face of the member 6 on a pivot 33.

In the description I have particularly described the inclosure for one side of the vehicle body, but it will be understood that the construction is duplicated for the opposite side of the vehicle, with the exception that the panels 1 and 3 may be rigidly secured in place on one side of the vehicle instead of being arranged to swing with the doors, if desired. It will be observed from the description of the construction that the parts are all designed with a view to economy in manufacture, and with a view to producing a combined inclosure that may be readily assembled and erected in connection with the vehicle body without any requirement for special skill in fitting the parts. It will also be observed that the inclosure may be applied to the vehicle body without disturbing, to any appreciable extent, the standard construction and that substantially all of the standard construction is utilized. Therefore, the construction provides a convenient means of converting a standard open vehicle body into a closed body which may be erected and disassembled in a short time, so that the body may be utilized either as an open or closed body according to the desires of the user.

I am aware that the invention may be modified in details without departure from the spirit and scope of the invention. I do not limit myself, therefore, to the exact construction described, but what I claim and desire to secure by Letters Patent, is:—

1. The combination with a vehicle body having a swinging door and a cape top; of a frame including a top stringer extending from the front end to the rear below a side edge of the top, a device removably supporting the rear end of the stringer in connection with the top, and a removable upright member supporting the forward end of the stringer and the top; a plurality of panels arranged to be supported by the frame; and hinges connecting the front panel with said upright member and also with the vehicle body in a manner to swing with the door of the body.

2. The combination with a vehicle body having a swinging door, a cape top, and pivoted bows for supporting the top; of a removable frame including a top stringer extending from the front end to the rear below a side edge of the top, a device removably supporting the rear end of the stringer in connection with the top, and an upright member supported in connection with a side edge of the top; a plurality of panels arranged to be supported by the frame; means for hinging one of said panels both to the vehicle body and to said removable frame in a manner to swing with said door of the body, and a single exterior door opening handle controlling both said panel and said door.

3. The combination with a vehicle body having a swinging door, a cape top, and pivoted bows for supporting the top; of a top stringer, a device adjustably supporting one end of said stringer in connection with one of the bows of the top; a removable upright member adjustably supported by the wind shield frame of the vehicle and connected with said stringer; a door hinged both to the vehicle body and to said member; a plurality of sashes arranged to be supported between the upper part of the body and said stringer rearwardly from the door; and separate flexible filling strips to close the space between the top and the stringer.

4. The combination with a vehicle body having swinging doors, a cape top, a wind shield frame, and pivoted bows for supporting the top; of a top stringer arranged to be adjustably supported at one end by one member of the top support; an upright member; an element for supporting the upright member in different adjusted positions in connection with the wind shield frame; a brace extending from the stringer to the front bow of the top support; and a plurality of sashes arranged in the space between the stringer and the upper line of the body, certain of said sashes being hinged both to the vehicle body and at points above the vehicle body to swing with the doors of the body.

5. The combination with a vehicle body having swinging doors, a cape top, and pivoted bows for supporting the top; of a top stringer arranged to be adjustably supported at one end by one member of the top support; an upright member; an element for supporting the upright member in different adjusted positions in connection with the wind shield frame; a brace extending from the stringer to the front bow of the top support; a plurality of sashes arranged in the space between the stringer and the upper line of the body, certain of said sashes being wider than the doors of the body and being hinged both to the vehicle body and at points above the body to swing with the doors of the body, and filling strips of flexible material closing the space between the stringer and the edges of the cape top.

JAMES B. FISHER.